(12) United States Patent
Malkin et al.

(10) Patent No.: US 7,369,245 B2
(45) Date of Patent: May 6, 2008

(54) SENSING COIL ASSEMBLY AND METHOD FOR ATTACHING A SENSING COIL IN A FIBER OPTIC GYROSCOPE

(75) Inventors: Michael M. Malkin, Scottsdale, AZ (US); Wesley H. Williams, Phoenix, AZ (US); Edward Summers, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 308 days.

(21) Appl. No.: 11/139,348

(22) Filed: May 27, 2005

(65) Prior Publication Data

US 2006/0268278 A1    Nov. 30, 2006

(51) Int. Cl.
*G01C 19/72* (2006.01)
(52) U.S. Cl. ..................................... 356/465
(58) Field of Classification Search ................ 356/465
See application file for complete search history.

(56) References Cited

U.S. PATENT DOCUMENTS

| | | | | |
|---|---|---|---|---|
| 4,856,900 | A * | 8/1989 | Ivancevic | 356/465 |
| 5,486,922 | A * | 1/1996 | Cordova | 356/465 |
| 5,546,482 | A * | 8/1996 | Cordova et al. | 356/465 |
| 5,624,521 | A * | 4/1997 | Hed | 156/275.7 |
| 5,767,509 | A * | 6/1998 | Cordova et al. | 250/227.19 |
| 6,496,263 | B1 * | 12/2002 | Hall et al. | 356/465 |
| 2004/0041085 | A1 | 3/2004 | McLean et al. | |

FOREIGN PATENT DOCUMENTS

EP    0 851 213 A2    1/1998

OTHER PUBLICATIONS

PCT International Search Report PCT/US2006/019992 Sep. 27, 2006.

* cited by examiner

*Primary Examiner*—Samuel A. Turner
(74) *Attorney, Agent, or Firm*—Black Lowe & Graham, PLLC

(57) ABSTRACT

A sensing coil assembly and method for attaching a sensing coil to a support structure are provided for a fiber optic gyroscope. The method comprises affixing a first support surface of the support structure to a first mounting surface of the sensing coil via a first preformed adhesive, and affixing a second support surface of the support structure to a second mounting surface of the sensing coil via a second preformed adhesive. The sensing coil assembly comprises a support structure having first and second support surfaces and having a substantially cylindrical hub coupled between the first and second opposing surfaces, an optical fiber coil surrounding at least a portion of the substantially cylindrical hub, and first and second preformed adhesive patterns affixing the optical fiber coil to the first and second opposing surfaces. The first support surface opposes the second support surface.

16 Claims, 3 Drawing Sheets

SENSING COIL ASSEMBLY AND METHOD FOR ATTACHING A SENSING COIL IN A FIBER OPTIC GYROSCOPE

FIELD OF THE INVENTION

The present invention generally relates to fiber optic gyroscope systems, and more particularly relates to an attachment system and method for attaching a sensing coil in a fiber optic gyroscope system.

BACKGROUND OF THE INVENTION

Gyroscopes have been used to measure rotation rates or changes in angular velocity about an axis. A basic conventional fiber optic gyroscope (FOG) includes a light source, a beam generating device (e.g., a beam-splitter), and a coil of optical fiber coupled to the beam generating device that encircles an area. The beam generating device transmits light beams originating from the light source into the coil of optical fiber, and these light beams propagate in a clockwise (CW) direction and a counter-clockwise (CCW) direction along the core of the optical fiber. The two counter-propagating (e.g., CW and CCW) beams experience different pathlengths while propagating around a rotating path, and the difference between the two pathlengths produces a phase difference between the two counter-propagating beams that is proportional to the rotational rate.

Many FOGs utilize a glass-based optical fiber to conduct light along a solid core of the fiber over long distances with low loss and distortion. This optical fiber has a glass/silica core surrounded by a polymer jacket, or buffer, and may be wound into a cylindrical structure, such as a coil, and affixed to a coil-supporting structure, such as a cylindrical hub, to form a sensing coil. The hub and fiber optic coil are both substantially cylindrical structures oriented about a center axis, and the hub has a relatively smaller radius than the radius of the fiber optic coil. An adhesive coating between the outer surface of the hub and inner surface of the fiber optic coil may be used affix the fiber optic coil to the hub.

Because the optical fiber is a composite structure, the glass/silica core and the polymer buffer may each respond differently to a variety of environmental factors and thereby adversely affect the pathlength difference between the two counter-propagating waves. Some of these environmental factors include temperature and mechanical strain that may create a bias between the phases of the two counter-propagating waves such that the output of the sensing coil yields a phase difference between the two counter-propagating waves that is indistinguishable from a rotation-induced phase difference. During operation, a FOG may be placed in an environment having a fluctuating ambient temperature. Temperature variations affect the sensing coil in two ways: first, the sensing coil undergoes mechanical strain as a result of a differential thermal expansion; and second, the optical transmission properties of the optical fiber change with the temperature. A Coefficient of Thermal Expansion (CTE) mismatch between the glass/silica core and the polymer buffer may result in a transverse expansion of the fiber optic coil that is significantly larger than the lengthwise expansion of the fiber optic coil. Because of the non-isotropic structure of the fiber optic coil, the radial expansion of the fiber optic coil, constrained by the glass/silica core of the optical fiber, is significantly smaller than the axial expansion of the fiber optic coil that is dominated by the large CTE of the polymer buffer. Further, the outer diameter of the fiber optic coil generally expands radially away from the center axis of the fiber optic coil while the inner diameter of the fiber optic coil generally expands radially toward the center axis of the fiber optic coil.

In addition to the expansion of the fiber optic coil, the hub may also expand in response to temperature fluctuations. For example, a hub made from an isotropic material may expand relatively uniformly in both the axial direction and in the radial direction with respect to the center axis. As a result, when a FOG is exposed to a temperature change such that the fiber optic coil and hub both expand, the hub radially expands faster than the fiber optic coil expands, as a whole, and imparts stress on the fiber optic coil. Additionally, the radial expansion of the hub against the opposite expansion direction of the inner diameter of the fiber optic coil may produce significant mechanical interference between theses components resulting in an outward radial pressure exerted at the fiber optic coil interface that induces stresses in the coil structure.

Employing a compliant adhesive, that distorts to accommodate the outward radial expansion of the hub as well as the inward radial expansion of the inner diameter of the fiber optic coil, may minimize such stresses on the fiber optic coil. When the adhesive is softer than the hub material, the stress induced in the fiber optic coil is generally less than the stress induced by the expanding hub alone. The hydrostatic pressure associated with the axial compression of the adhesive material is relieved through its expansion in lateral directions to the extent allowed by hyper-elastic properties of the adhesive material and by the available free area around the adhesive.

One method of applying the compliant adhesive is to inject a liquid adhesive, such as a Room Temperature Vulcanizing (RTV) adhesive, through small orifices in the mounting structure (e.g., a coil hub). Typically, the RTV adhesive is a two-part adhesive that is first mixed and then manually injected through the orifices of the bottom surface of the mounting structure via controlled nozzles. Following a curing period, the two-part adhesive is prepared again and then manually injected through the orifices of the top surface of the mounting structure via the controlled nozzles. The sensing coil process completes after another curing period. The combination of the curing periods for the RTV adhesive and the manual effort to inject the RTV adhesive generally consumes a significant amount of process time.

In addition to the significant process time, the manufacture of conventional coil hubs is generally labor intensive. Small variations in fiber buffer diameter may accumulate and result in a significant variation in coil height from one fiber optic coil to another fiber optic coil. In general, fiber optic coils are measured after fabrication of the coils, and the coil hubs supporting such fiber optic coils are custom sized to the coils. Typically, the coil hubs are pre-machined and subsequently re-machined after measuring the fiber optic coils. Both the custom machining and the formation of the orifices through the top and bottom surface of the coil hub complicate the manufacturing process of the FOG.

Accordingly, it is desirable to provide a less complex method for attaching a sensing coil to a support structure in a fiber optic gyroscope while minimizing the coil stress from environmental factors. In addition, it is desirable to provide a sensing coil assembly for a fiber optic gyroscope having minimal construction steps while decreasing the coil stress from environmental factors. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A sensing coil assembly for a fiber optic gyroscope and methods are provided for attaching a sensing coil to a support structure in a fiber optic gyroscope. In an exemplary embodiment, the method comprises affixing a first support surface of the support structure to a first mounting surface of the sensing coil via a first preformed adhesive, and affixing a second support surface of the support structure to a second mounting surface of the sensing coil via a second preformed adhesive.

In another exemplary embodiment, the method comprises applying a first preformed adhesive pattern to a first surface of the support structure, affixing the sensing coil to the first surface of the support structure via the first preformed adhesive pattern, applying a second preformed adhesive pattern to one of the sensing coil and a second surface of the support structure, and affixing the sensing coil to the second surface of the support structure via the second preformed adhesive pattern.

In yet another exemplary embodiment, the sensing coil assembly comprises a support structure having first and second support surfaces and having a substantially cylindrical hub coupled between the first and second opposing surfaces, an optical fiber coil surrounding at least a portion of the substantially cylindrical hub, and first and second preformed adhesive patterns affixing the optical fiber coil to the first and second opposing surfaces. The first support surface opposes the second support surface.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A sensing coil assembly and method for attaching a sensing coil to a support structure in a fiber optic gyroscope (FOG) are provided. In one exemplary embodiment, the sensing coil assembly comprises a support structure having first and second support surfaces and having a substantially cylindrical hub coupled between the first and second opposing surfaces, an optical fiber coil surrounding at least a portion of the substantially cylindrical hub, and first and second preformed adhesive patterns affixing the optical fiber coil to the first and second opposing surfaces. The first support surface opposes the second support surface.

Figure 1:
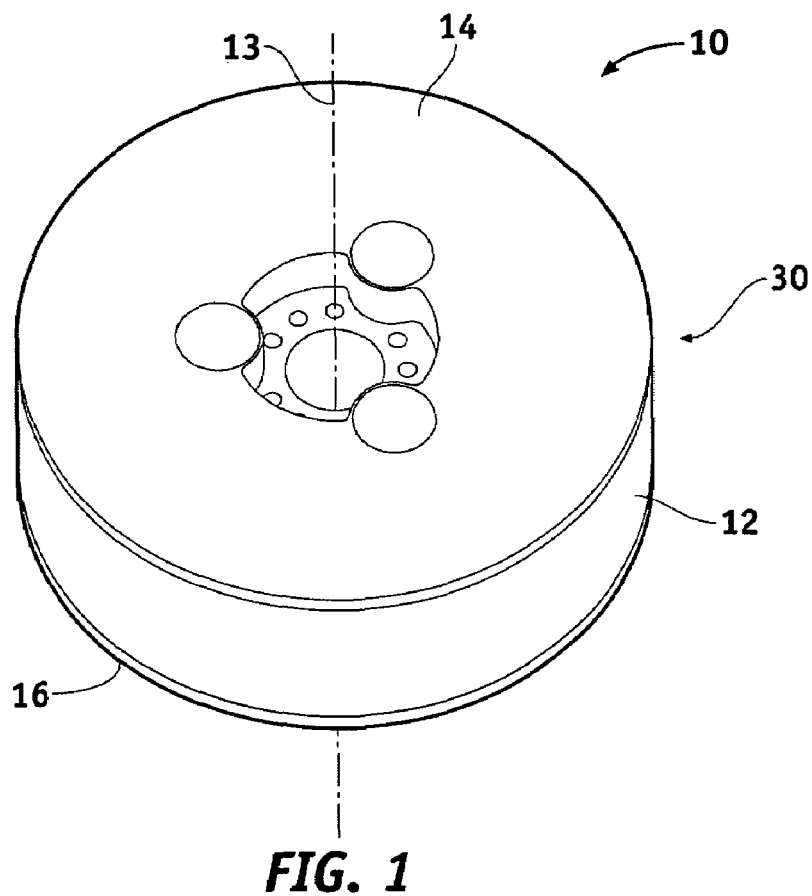
FIG. 1 is a perspective view of a sensing coil assembly for a fiber optic gyroscope in accordance with an exemplary embodiment of the present invention.
Figure 2:
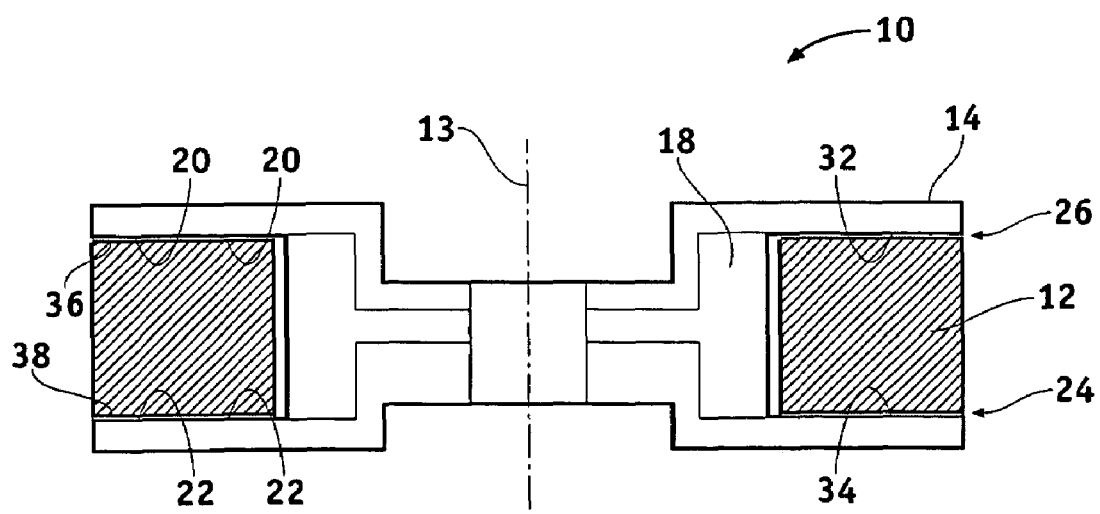
FIG. 2 is a cross-sectional view of the sensing coil assembly shown in FIG. 1.
Figure 3:
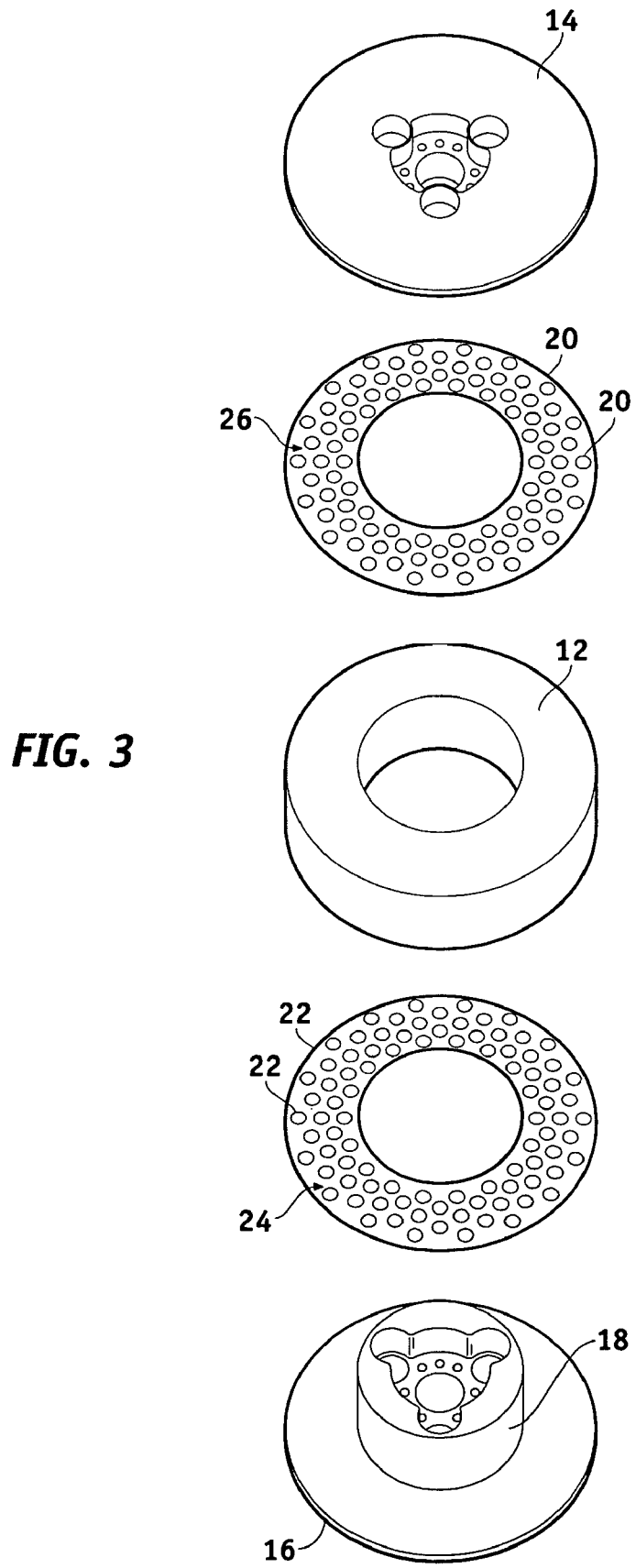
FIG. 3 is an exploded view of the sensing coil assembly shown in FIG. 1.

Referring now to the drawings, FIG. 1 is a perspective view of a sensing coil assembly 10 for a FOG in accordance with an exemplary embodiment of the present invention. FIG. 2 is a cross-sectional view of the sensing coil assembly shown in FIG. 1. FIG. 3 is an exploded view of the sensing coil assembly 10 shown in FIG. 1. The sensing coil assembly 10 comprises a support structure 30, such as a hub, a sensing coil 12 surrounding at least a portion of the support structure 30, and a preformed adhesive 24, 26 affixing the sensing coil 12 to the support structure 30. The support structure 30 comprises a bottom flange 16, a top flange 14, and a substantially cylindrical wall 18 coupling the bottom flange 16 to the top flange 14. In an exemplary embodiment, the bottom flange 16 provides a first support surface 34, and the top flange 14 provides a second support surface 32. The support surfaces 34, 32 both couple with the sensing coil 12 via the preformed adhesive 24, 26. When combined to form the sensing coil assembly 10, both the sensing coil 12 and the support structure 30 are oriented about an axis 13 of the cylindrical wall 18.

The support structure 30 may be made from a variety of materials. Exemplary hub materials include, but are not limited to: metal alloys, such as titanium; sintered metal composites made using powder metallurgy, such as copper tungsten or copper molybdenum; composite materials, such as filament wound fiber glass/epoxy, fiber glass/epoxy or aramid/epoxy; metal matrix composites, such as metal reinforced with ceramics such as boron, silicon, carbide, and graphite; ceramics; and, a composite made from any of the aforementioned materials. Although each of these materials may exhibit different thermal expansion, the selection of the hub material is not critical to minimizing coil stress from environmental factors, such as temperature and mechanical stress. The selection of hub material may be based in part on a particular application of the FOG and may influence the choice of both the adhesive and support structure 30 to optimize the particular application.

The sensing coil 12 comprises a wound optical fiber made from a glass medium. The optical fiber has an inner glass core and an outer glass shell, and the inner glass core and the outer glass shell have different optical indices of refraction. A polymer coating, or jacket, covers the outer glass to protect the surface of the outer glass from defects. In general, the optical fiber is specifically wound onto a bobbin, adhered, and cured to form the sensing coil 12 although other methods may be used to produce the sensing coil 12 from the optical fiber. The sensing coil 12 is substantially cylindrical with a relatively thick cylindrical wall of optical fiber and has first and second mounting surfaces 38, 36 for coupling to the first and second support surfaces 34, 32, respectively, via the preformed adhesive 24, 26. For example, the sensing coil 12 has a first mounting surface 38 for coupling with the first support surface 34 and has a second mounting surface 36 for coupling with the second support surface 32.

In an exemplary embodiment, the preformed adhesive 24, 26 comprises a first adhesive pattern 24 that affixes the first mounting surface 38 to the first support surface 34, and a second adhesive pattern 26 that affixes the second mounting surface 36 of the sensing coil 12 to the second support surface 32. Each of the adhesive patterns 24, 26 are substantially uniform, such as a uniform array of adhesive dots 20, 22 or the like. The adhesive patterns 24, 26 comprise a two-sided dry visco-elastic damping polymer, or other pressure sensitive material, that is preformed (e.g., precut from a layer of the dry visco-elastic damping polymer) into a variety of uniform patterns. The adhesive patterns 24, 26 may include backings (e.g., top and/or bottom backings) to protect the two sides of the adhesive and to assist in placing the adhesive patterns 24, 26 between the sensing coil 12 and the support structure 30. For example, each of the adhesive patterns 24, 26 may be manipulated as a single unit using the backings. The backings of the adhesive patterns are removed to expose the adhesive prior to applying the adhesive patterns between the support structure 30 and the sensing coil 12.

In this exemplary embodiment, the first preformed adhesive pattern 24 is placed between the first support surface 34 and the first mounting surface 38, and the second preformed adhesive pattern 24 is placed between the second support surface 32 and the second mounting surface 36. At least one of the adhesive patterns 24, 26 may be preloaded with a predetermined compression upon affixing the sensing coil 12 to the support structure 30. The adhesive patterns 24, 26 significantly reduces reaction loads applied to the sensing coil 12 during expansion and contraction, such as from temperature fluctuations, and thereby minimizes distortion of the sensing coil 12. Additionally, using preformed and substantially non-liquid adhesive patterns significantly reduces process time for attaching the sensing coil 12 to the support structure 30.

Figure 4:
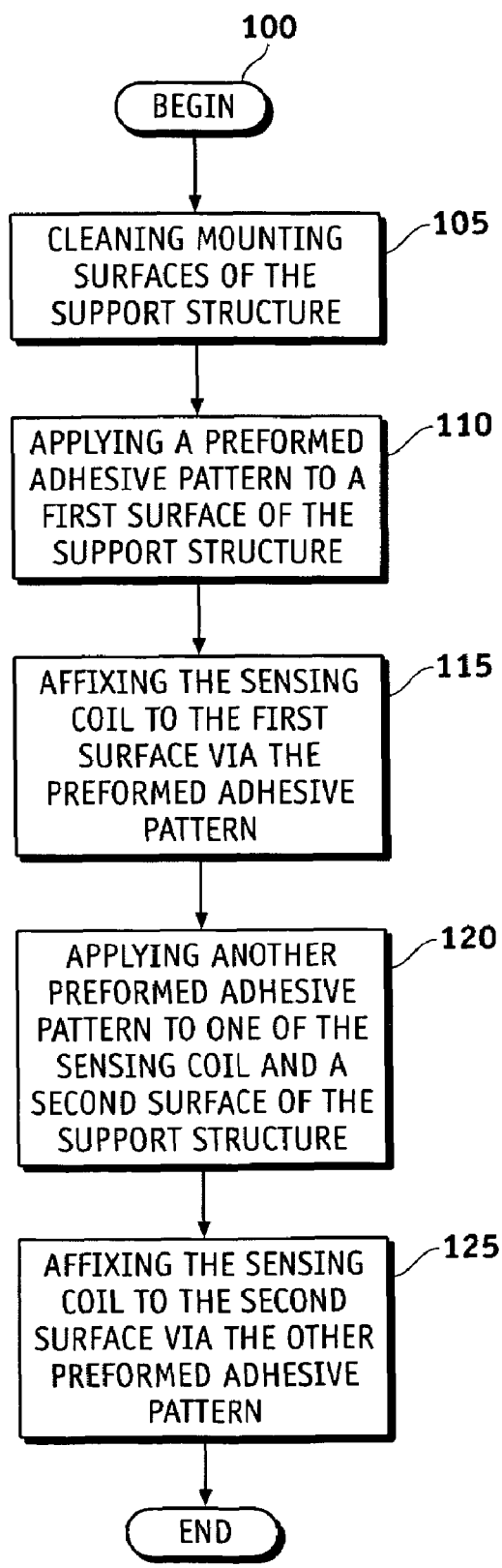
FIG. 4 is a flowchart of a method for attaching a sensing coil to a support structure in a fiber optic gyroscope in accordance with an exemplary embodiment of the present invention.

FIG. 4 is a flowchart of a method for attaching a sensing coil to a support structure in a fiber optic gyroscope in accordance with an exemplary embodiment of the present invention. The method begins at step 100. The support surfaces 32, 34 (FIG. 2) are cleaned and prepared for applying a pair of preformed adhesive patterns 24, 26 (FIG. 2) at step 105. The first preformed adhesive pattern 24 (FIG. 2) is applied to the first support surface 34 (FIG. 2) at step 110. The backing on one side of the first preformed adhesive pattern 24 (FIG. 2) is removed to expose the adhesive while the backing on the other side of the first preformed adhesive pattern 24 protects the adhesive during application of the first preformed adhesive pattern 24. After applying the first preformed adhesive pattern 24 (FIG. 2) to the first support surface 34 (FIG. 2), the remaining backing is removed. The first mounting surface 38 (FIG. 2) is affixed to the first support surface 34 (FIG. 2) via the first preformed adhesive pattern 24 (FIG. 2) at step 115. Prior to affixing the first mounting surface 38 (FIG. 2) to the first support surface 34 (FIG. 2), the sensing coil 12 is axially aligned (e.g., aligned with the axis 13 of the cylindrical wall 18 of the support structure 12 shown in FIG. 2). Upon affixing the first mounting surface 38 (FIG. 2) to the first support surface 34 (FIG. 2), the first preformed adhesive pattern 24 (FIG. 2) is preloaded with a predetermined compression (e.g., a 0.005 in. compression depth). The second preformed adhesive pattern 26 (FIG. 2) is applied to either the second mounting surface 36 (FIG. 2) or the second support surface 32 (FIG. 2) at step 120. Similar to the first preformed adhesive pattern 24 (FIG. 2), the backing on one side of the second preformed adhesive pattern 26 (FIG. 2) is removed to expose the adhesive while the backing on the other side of the second preformed adhesive pattern 26 protects the adhesive during application of the second preformed adhesive pattern 26. After applying the second preformed adhesive pattern 24 (FIG. 2) to either the second support surface 32 (FIG. 2) or the second mounting surface 36 (FIG. 2), the remaining backing may be removed. The second mounting surface 36 (FIG. 2) is affixed to the second support surface 32 (FIG. 2) via the second preformed adhesive pattern 26 (FIG. 2) at step 125. Upon affixing the second mounting surface 36 (FIG. 2) to the second support surface 32 (FIG. 2), the second preformed adhesive pattern 26 (FIG. 2) may also be preloaded with a predetermined compression.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for attaching a sensing coil to a support structure in a fiber optic gyroscope, the method comprising the steps of:
   affixing a first support surface of the support structure to a first mounting surface of the sensing coil via a first preformed adhesive; and
   affixing a second support surface of the support structure to a second mounting surface of the sensing coil via a second preformed adhesives,
   wherein at least one of affixing the first or second support surfaces comprises compressing the first or second preformed adhesives with a predetermined preload.

2. A method according to claim 1 further comprising cleaning the first and second surfaces of the support structure prior to said step of affixing the first support surface and said step of affixing the second support surface.

3. A method according to claim 1 further comprising axially aligning the sensing coil with the first support surface of the support structure.

4. A method according to claim 1, wherein said step of affixing the first support surface comprises:
   placing the first preformed adhesive on the first support surface; and
   mounting the first mounting surface onto the first support surface.

5. A method according to claim 4, wherein said step of affixing the second support surface comprises:
   placing the second preformed adhesive on the second mounting surface; and
   mounting the second support surface onto the second mounting surface.

6. A method for attaching a sensing coil to a support structure in a fiber optic gyroscope (FOG), the method comprising the steps of:
   applying a first preformed adhesive pattern to a first surface of the support structure;
   affixing the sensing coil to the first surface of the support structure via the first preformed adhesive pattern;
   applying a second preformed adhesive pattern to the one of the sensing coil and a second surface of the support structure; and
   affixing the sensing coil to the second surface of the support structure via the second preformed adhesive patterns, wherein said step of affixing the sensing coil to the first surface comprises compressing the sensing coil into the first preformed adhesive pattern with a predetermined preload.

7. A method according to claim 6 further comprising the step of cleaning the first and second surfaces of the support structure prior to said step of applying the first preformed adhesive pattern and said step of applying the second preformed adhesive pattern.

8. A method according to claim 6, wherein said step of affixing the sensing coil to the first surface comprises axially aligning the sensing coil with the first surface of the support structure.

9. A method according to claim 6, wherein the sensing coil has a first mounting surface and a second mounting surface opposing the first mounting surface; and wherein said step of affixing the sensing coil to the first surface comprises affixing the first mounting surface to the first surface of the support structure via the first preformed adhesive pattern; and wherein said step of affixing the sensing coil to the second surface comprises affixing the second mounting surface to the second surface of the support structure via the second preformed adhesive pattern.

10. A sensing coil assembly for a fiber optic gyroscope, the sensing coil assembly comprising:

a support structure comprising:
first and second support surfaces, said first support surface opposing said second support surface; and
a substantially cylindrical hub coupled between said first and second opposing surfaces;

an optical fiber coil surrounding at least a portion of said substantially cylindrical hub; and first and second preformed adhesive patterns affixing said optical fiber coil to said first and second opposing surfaces, wherein said first and second preformed adhesive patterns each comprises a dry adhesive.

11. A sensing coil assembly according to claim 10, wherein said optical fiber coil comprises:
a first mounting surface; and
a second mounting surface opposing said first mounting surface.

12. A sensing coil assembly according to claim 11, wherein said first preformed adhesive pattern affixes said first mounting surface to said first support surface; and
wherein said second preformed adhesive pattern affixes said second mounting surface to said second support surface.

13. A sensing coil assembly according to claim 10, wherein said first and second preformed adhesive patterns each comprises a uniform array of adhesive dots.

14. A sensing coil assembly for a fiber optic gyroscope, the sensing coil assembly comprising:

a support structure comprising:
first and second support surfaces, said first support surface opposing said second support surface; and
a substantially cylindrical hub coupled between said first and second opposing surfaces;

an optical fiber coil surrounding at least a portion of said substantially cylindrical hub; and first and second preformed adhesive patterns affixing said optical fiber coil to said first and second opposing surfaces, wherein said first and second preformed adhesive patterns each comprises a dry adhesive, wherein said first and second preformed adhesive patterns each comprises a visco-elastic dampening polymer, and wherein at least one of said first and second preformed adhesive patterns is preloaded to a predetermined compression.

15. A sensing coil assembly according to claim 14, wherein when the sensing coil assembly encounters a vibration said visco-elastic dampening is configured to attenuate said vibration.

16. A method for attaching a sensing coil to a support structure in a fiber optic gyroscope (FOG), the method comprising the steps of:

applying a first preformed adhesive pattern to a first surface of the support structure;

affixing the sensing coil to the first surface of the support structure via the first preformed adhesive pattern;

applying a second preformed adhesive pattern to the one of the sensing coil and a second surface of the support structure; and affixing the sensing coil to the second surface of the support structure via the second preformed adhesive pattern, wherein said step of affixing the sensing coil to the first surface comprises compressing the sensing coil into the first preformed adhesive pattern with a predetermined preload, wherein the first and second preformed adhesive patterns each comprise first and second backings and a substantially dry adhesive between the first and second backings, wherein said step of applying the first preformed adhesive pattern comprises removing the first and second backings of the first preformed adhesive pattern, wherein said step of applying the second preformed adhesive pattern comprises removing the first and second backings of the second preformed adhesive pattern.

* * * * *